United States Patent
Thakkar et al.

(10) Patent No.: US 8,942,319 B2
(45) Date of Patent: Jan. 27, 2015

(54) PARTIAL RESPONSE EQUALIZER AND RELATED METHOD

(75) Inventors: Chintan S. Thakkar, Berkeley, CA (US); Kun-Yung Chang, Los Altos, CA (US); Ting Wu, Tianjin (CN)

(73) Assignee: Rambus Inc., Sunnyvale, CA (US)

(*) Notice: Subject to any disclaimer, the term of this patent is extended or adjusted under 35 U.S.C. 154(b) by 978 days.

(21) Appl. No.: 13/072,642

(22) Filed: Mar. 25, 2011

(65) Prior Publication Data
US 2011/0249774 A1 Oct. 13, 2011

Related U.S. Application Data

(60) Provisional application No. 61/322,265, filed on Apr. 8, 2010.

(51) Int. Cl.
*H03D 3/22* (2006.01)
*H04L 27/22* (2006.01)
*H04L 25/03* (2006.01)

(52) U.S. Cl.
CPC .............................. *H04L 25/03057* (2013.01)
USPC .......................................... 375/331; 375/229

(58) Field of Classification Search
CPC ................. G11B 20/10055; G11B 20/10083; G11B 20/10101; G11B 20/10111; H04L 27/01; H04L 27/2647
USPC .......................................... 375/229–236, 331
See application file for complete search history.

(56) References Cited

U.S. PATENT DOCUMENTS

| 7,254,343 B2 | 8/2007 | Gu et al. ......................... 398/164 |
| 2009/0175328 A1 | 7/2009 | Kim et al. ....................... 375/233 |
| 2011/0018599 A1* | 1/2011 | Abbasfar ........................ 327/158 |

OTHER PUBLICATIONS

Wang, Li, et al., "An Improved Decision Feedback Loop for Optical Communication", pp. 3. University of Paderborn, Warburger, Germany; publication date Mar. 24, 2004. 3 Pages.

* cited by examiner

Primary Examiner — Curtis Odom

(57) ABSTRACT

A multi-phase partial response receiver supports various incoming data rates by sampling PrDFE output values at a selected one of at least two clock phases. The receiver includes a calibration circuit that performs a timing analysis of critical data paths in the circuit, and this analysis is then used to select the particular clock phase used to latch the output values. These techniques permit the multiplexer outputs from for each phase of the partial response receiver to directly drive selection of a multiplexer for the ensuing phase, i.e., by avoiding regions of instability or uncertainty in the respective multiplexer outputs.

33 Claims, 14 Drawing Sheets

| Case | Pulse Detect$_1$ (A > 1UI) out$_1$ | Pulse Detect$_2$ (A+B > 1UI) out$_2$ | Constraints | CAL |
|---|---|---|---|---|
| 1 | 0 | 0 | A > 1UI, A+B > 1UI | 0 |
| 2 | 0 | 1 | A > 1UI, A+B < 1UI | invalid |
| 3 | 1 | 0 | A < 1UI, A+B > 1UI | 0 or 1 |
| 4 | 1 | 1 | A < 1UI, A+B < 1UI | 1 |

Fig. 9

| Case | Pulse Detect$_3$ out$_3$ | Constraints | CAL |
|---|---|---|---|
| 1 | 1 | A + B/2 < 1UI | 1 |
| 2 | 0 | A + B/2 > 1UI | 0 |

Fig. 11

| Case | Pulse Detect$_1$ (A > 2UI) out$_1$ | Pulse Detect$_2$ (A+B > 1UI) out$_2$ | Constraints | CAL |
|---|---|---|---|---|
| 1 | 0 | 0 | A > 2UI, A+B > 1UI | 0 |
| 2 | 0 | 1 | A > 2UI, A+B < 1UI | invalid |
| 3 | 1 | 1 | A < 2UI, A+B < 1UI | 1 |
| 4 | 1 | 0 | A < 2UI, A+B > 1UI, | 0 or 1 |

Fig. 15

PARTIAL RESPONSE EQUALIZER AND RELATED METHOD

The present invention relates generally to the field of communications, and more particularly to high speed electronic signaling within and between integrated circuit devices.

BACKGROUND

Multi-gigabyte data rates, common in high speed signaling systems, can be affected by dispersion-type inter-symbol interference (ISI) created by the channels and interfaces that connect integrated circuits (IC). The effects of this ISI typically have a greater impact upon "data eyes" of each transmitted signal at faster signaling rates, ultimately degrading the signal quality to the point where it becomes difficult to interpret the digital levels represented by the signal.

Receivers in these systems sometimes use a decision-feedback equalizer (DFE) to cancel this ISI. A DFE uses the feedback of one or more previously resolved symbols to offset their impact on the incoming symbol. Typically, each of the n recently received symbols is multiplied by some weighting (e.g., a coefficient), and these are used to adjust the received signal to offset ISI. The ISI associated with the prior data is thereby removed.

In some high-speed systems it can be difficult to resolve the most recent data bit(s) in time to close a tight feedback loop at high clock rates. Some receivers ignore the impact of such bit(s) on the incoming signal, and consequently fail to correct for the ISI-attributed to those bits. Other receivers employ "partial response" DFEs (PrDFEs) that produce multiple "conditional samples" of incoming data, each assuming a different threshold (based on possible states of as-yet, still unresolved previous data). The correct sample is then selected from the multiple conditional samples after the previously received bit(s) is resolved. As implied, usually only the immediately previously received bit is used for partial response equalization (i.e., to select the conditional sample), although it is possible to base partial response evaluation on two or more previously resolved bits.

FIG. 1 illustrates a prior art receiver 100 for use in a double data rate (DDR) signaling system. The receiver 100 has two individual partial response circuits 102 and 104, each of which samples one of two bits in an incoming data signal during each period of a sampling clock signal, clk. Samplers 106, 108, 118 and 120 compare an input signal, $D_{in}$, to threshold levels, $-/+\alpha$, along redundant parallel sampling paths to generate sampled bits, DNO, DPO, DNE, and DPE respectively ("O" and "E" stand for "odd" and "even," respectively). Samplers 106 and 108 are driven by clock signal, clk, and samplers 118 and 120 are driven by clock signal, clkb, which is of the same frequency but 180° out of phase with clk. Register/multiplexer combination 110, 112 and 114 selects one of two conditional samples from samplers 106 and 108 based on a previously revolved bit (e.g., using a selection signal 117 based on an immediately preceding bit from partial response circuit 104), and register/multiplexer combination 122, 124 and 126 selects one of two conditional samples from samplers 118 and 120 based on a previously revolved bit (e.g., using a selection signal 129 that originates from partial response circuit 102). There are other configurations possible other than that shown in FIG. 1, i.e., partial response may be employed in a single data rate, quad data rate, or other type of receiver. The reference acronym "$D_n$" will be used to refer to a "current" data value (e.g., to be resolved by the receiver 100 at time or interval "n"), and the reference acronym "$D_{n-1}$" will be used to refer to the immediately preceding data value (i.e., at time or interval "n−1"). The outputs selected by multiplexers 114 and 126 are stored in latches 116 and 128 respectively, in response to a respective one of the clkb and clk clock signals.

While conventional in many systems and useful for a wide range of signaling rates, PrDFE receivers such as the one illustrated in FIG. 1 can actually impose limitations on the signaling that can be used. This is in part because the feedback from one partial response circuit to the other (i.e., selection signal 117 or 129) needs to be "in time" to properly influence the decision on the next bit of the input signal. Thus, the timing constraint for the feedback path has to be less than one unit interval (1 UI) of the input signal in order to guarantee reliable receiver operation. The timing constraint that needs to be met in order for the feedback loop to complete in time within the minimum bit period is approximately $t_{ck-Q}+t_{sel}<1$ UI, where $t_{ck-Q}$ is the clock-to-output delay of the latch, 116 or 128, and $t_{sel}$ is the delay associated with controlling the ensuing multiplexer 126 or 114.

Unfortunately, while signaling rates continue to increase, the speed of digital circuitry (such as the circuitry illustrated in FIG. 1) generally does not improve at the same pace. The result is that the feedback timing constraint just referenced becomes difficult to achieve for high signaling rates, i.e., $t_{ck-Q}+t_{sel}$ becomes an obstacle as a UI becomes increasingly small for higher signaling rates. This limits the effective signally rate that can be used with some PrDFE designs, such as represented by the circuit of FIG. 1. Thus, there is a definite need for techniques that can speed up PrDFE to keep up with relatively faster signaling rates.

BRIEF DESCRIPTION OF THE DRAWINGS

The subject matter disclosed is illustrated by way of example, and not by way of limitation, in the figures of the accompanying drawings in which like reference numerals refer to similar elements and in which:

FIG. 9 depicts the outputs generated by the calibration circuitry shown in FIG. 8;

FIG. 11 depicts certain outputs generated by the calibration circuitry shown in FIG. 10;

FIG. 15 depicts outputs generated by the calibration circuitry shown in FIG. 14.

DETAILED DESCRIPTION

A signal receiving circuit for use in electrical signaling systems is disclosed in various embodiments. In one embodiment, the signal receiving circuit is a multi-phase PrDFE receiver having a feedback timing constraint of $t_{sel}$<1 UI. This improved feedback timing constraint ensures that the feedback latency is within the minimum bit period and enables the receiver to handle relatively faster data signaling rates. As a consequence, the various embodiments presented below allows the use of PrDFE in faster signaling systems.

Figure 1:
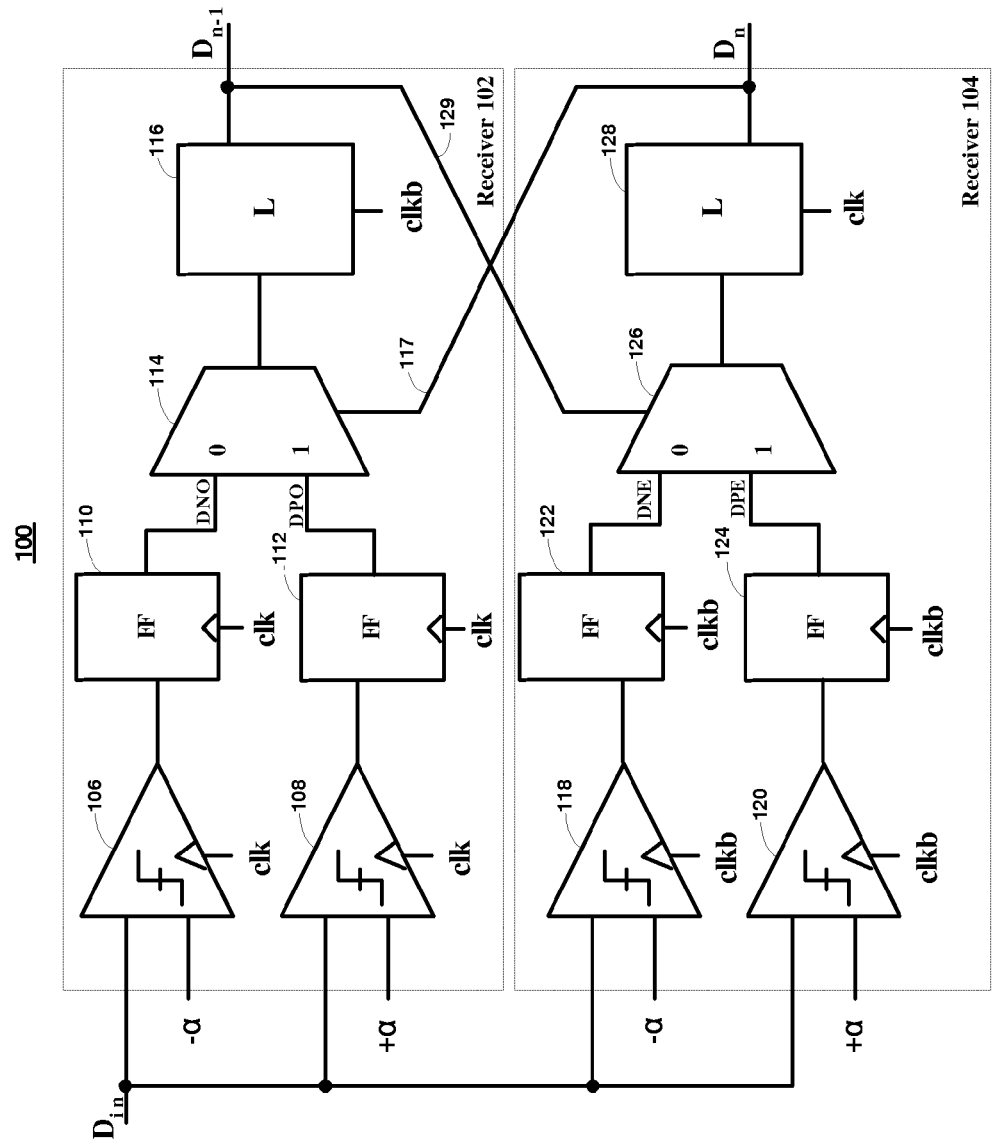
FIG. 1 is a prior art receiver for use in a double data rate (DDR) signaling system.

More particularly, a multi-phase receiver includes multiple PrDFE circuits, an output circuit and a calibration circuit. Each PrDFE circuit generates two or more conditional samples and selects one of these to produce a resolved value (e.g., a bit value) based on a previously resolved value from another one of the PrDFE circuits. The output circuit delays each resolved value out according to a clock signal. The calibration circuit may be used to perform analysis of the critical paths in the receiver to determine the speed of the receiver circuit. Based on this analysis, the calibration circuit can determine the appropriate clock phase at which the outputs of the PrDFE circuits are stable. In this manner, the latch 116 or 128 used in the prior art of FIG. 1 is eliminated thereby relaxing the feedback timing constraint so that faster signaling rates can be processed. Elaborating, by selecting timing at which to sample the outputs of a cross-coupled multiplexer, dependent on system signaling rate (and sampling clock), the cross-coupled multiplexer may be sampled at a time when the multiplexer outputs are stable, avoiding regions of time when the data is uncertain.

Attention now turns to a further description of the embodiments of this improved receiver. Notably, as used herein, a "receiver" should be generally understood to be a per-channel (or per lane) circuit that resolves one or more data values; a "PrDFE" circuit should be understood to be that circuitry that produces and selects between multiple conditional samples for a given phase of the input signal (e.g., "even" or "odd" phase in the case of a DDR receiver). Thus, a double data rate (DDR) PrDFE receiver may include two PrDFE circuits, a quad data rate (QDR) PrDFE receiver may include four PrDFE circuits, and so on.

Figure 2A:
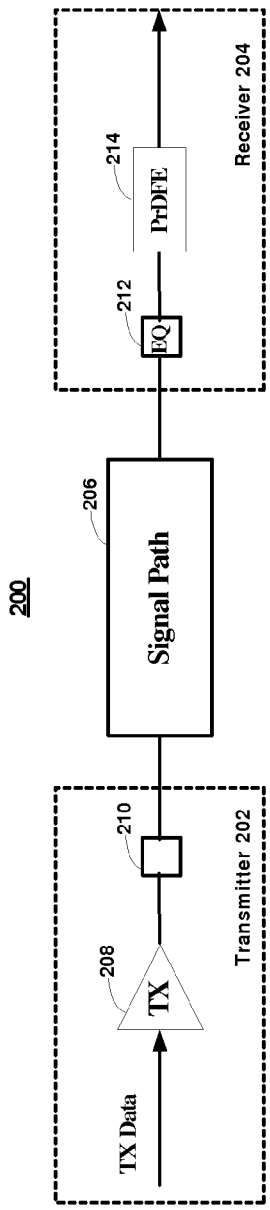
FIG. 2A illustrates a signaling system in accordance with one embodiment.

FIG. 2A illustrates a signaling system 200 for use in one embodiment. The system 200 includes a transmitter 202 and a receiver 204 coupled to one another via a high-speed signal path or channel 206. In one embodiment, the transmitter 202 and receiver 204 are contained in separate IC devices mounted to a common structure with the signal path 206 coupled directly to the IC devices (e.g., both ICs mounted to a circuit board and coupled to one another via circuit board traces, or both ICs packaged within a single multi-chip module with signal path 206 formed between the ICs by bond wires or other conducting structures). In another embodiment, the transmitter 202 and receiver 204 may be included within the same IC device (e.g., system on chip) and the signal path 206 implemented by a metal layer or other conducting structure within the IC device.

The system 200 can be utilized in a number of different applications. In one embodiment, the system 200 can be a memory system. The transmitter 202 may be a memory controller and the receiver 204 can be part of a memory device (e.g., DRAM, SRAM, RRAM, etc.) or vice versa, the transmitter 202 may be part of a memory device and the receiver 204 may be part of a memory controller. The transmitter 202 and receiver 204 can be located on the same or separate ICs. Alternatively, the system 200 can be part of a memory device positioned on a single IC. Generally speaking, one contemplated application of the system 200 is to a bidirectional memory system where the transmitter is employed in each of a memory controller IC and a DRAM IC, and the receiver is also employed in the memory controller IC and the DRAM IC, for transmissions from one IC to the other. The DRAM IC may be a dedicated memory device that receives read and write commands for a specific memory address, and that multiplexes memory contents responsive to the address onto or off of one or more channels or lanes of the signal path (e.g., onto signaling pins for a parallel or serial data transmission system).

Regardless of system application, the transmitter 202 transmits data on the signal path 206 during successive time intervals. The transmitted data signal arrives at the input of the receiver 204 after a propagation time, $T_p$ (not shown in FIG. 2A), and is sampled by the receiver 204. The transmitter 202 may include a driver 208 and a transmit equalizer 210. The transmit equalizer 210, if used in the particular system, distorts the transmitted signal in order to offset the long term signal reflections or distortion associated with the signal path 206 (for example, latencies that cannot be corrected for by a PrDFE receiver, or for high frequency signal line attenuation).

The receiver 204 may also include a receive-side equalizer 212 (e.g., either in addition to or in lieu of the transmit equalizer) and one or more PrDFE circuits 214; only one PrDFE circuit is used in this embodiment, although additional circuits may be used, e.g., for additional phases associated with a DDR or QDR system. Equalizer 212 equalizes the received data signal from signal path 206 to produce equalized signal $D_{in}$. Equalizer 212 amplifies the received data signal using a range of amplification factors, for example, with higher frequency components typically being treated to higher amplification factors. The PrDFE circuit 214 then reduces or eliminates ISI attributed to one or more "most recently received" symbols associated with the transmission.

Figure 2B:
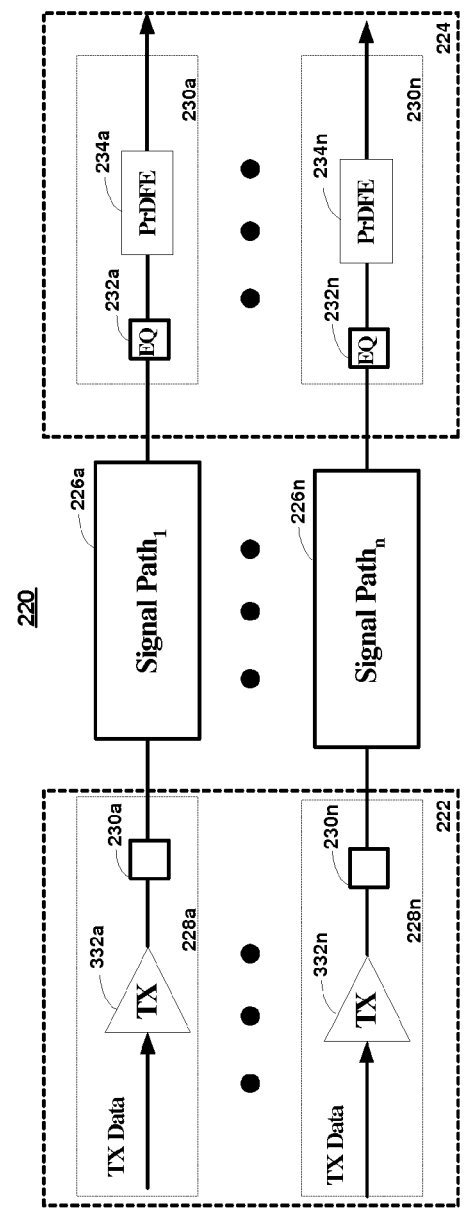
FIG. 2B illustrates a signaling system in accordance with another embodiment.

FIG. 2B illustrates a multi-channel signaling system 220 in accordance with another embodiment. System 220 can include two integrated circuits (ICs) 222 and 224 that communicate through several communication channels or signal paths 226a-226n. As mentioned, these ICs may respectively be a memory controller and discrete DRAM device, or vice-versa. Transmitters 228a-228n from IC 222 transmit data signals through the various signal paths (e.g., channels/lanes) 226a-226n to a corresponding receiver 230a-230n on IC 224. Each transmitter 228a-n may include a transmit equalizer 230a-n and an output driver 232a-n. Each receiver 230a-n can include an equalizer 232a-n and a PrDFE circuit 234a-n. In another embodiment, the transmitters 228a-228n and receivers 230a-230n may be included within the same IC device and the signal paths 226a-226n implemented by a metal layer or other conducting structure within the IC device. The signaling paths may be configured as part of a serial or parallel bus, and may reflect single ended or differential signaling format.

Depending on implementation, it may be desired to calibrate each receiver 230a-n to be calibrated separately, and to perform calibration on a static or dynamic basis. For example, in some semiconductor devices, there can be on chip variations (OCV) within different parts of a single die. The OCV can be due to PVT (pressure, voltage or temperature) variations that occur with respect to time, or that occur within different circuit elements on different parts of the die. In the case of time-based variations, it may be desired to perform calibration dynamically, e.g., every few milliseconds or at some other schedule, and in the case of circuit or geography based variations, it may be desired to perform calibration independently for each receiver. As this statement implies, in at least one embodiment, calibration may be performed for one signaling path and shared across multiple receivers.

Figure 3:
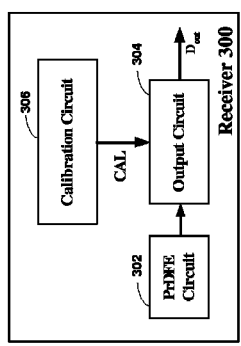
FIG. 3 illustrates partial response techniques in accordance with an embodiment.

FIG. 3 shows a schematic of a receiver 300 having one or more PrDFE circuits 302, an output circuit 304 and a calibration circuit 306. Each PrDFE circuit 302 is responsible for conditionally sampling the input signal and outputting a resolved symbol value according to an associated phase of a sampling clock cycle, or symbol interval. The output circuit 304 samples each PrDFE circuit output at timing during which the respective output is stable. The calibration circuit 306 determines this timing based on analysis of the receiver circuits 302; if desired, this analysis can take into consideration time varying factors, such as the PVT characteristics inherent in the IC. The result of this analysis is indicated through a CAL signal, transmitted to the output circuit 304.

Figure 4A:
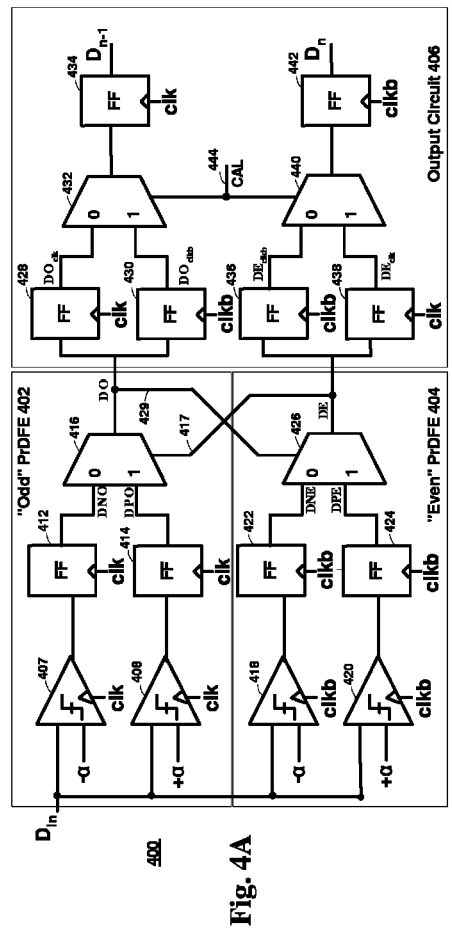
FIG. 4A illustrates a DDR receiver in accordance with another embodiment.

FIG. 4A presents an embodiment that uses PrDFE techniques in a DDR signaling system. A receiver 400 has two PrDFE circuits 402, 404 coupled to an output circuit 406. One of the PrDFE circuits (402) is an odd-phase receive circuit or receiver 402, clocked by the odd-phase sampling clock signal clk, and one of the PrDFE circuits (404) is an even-phase receive circuit or receiver 404, clocked by the even-phase sampling clock signal clkb.

The odd-phase PrDFE circuit 402 includes two samplers 407 and 408, used to sample the input data signal $D_{in}$. The samplers 407 and 408 have threshold levels that are dependent on two possible partial responses to the preceding symbol. The threshold level of sampler 407 is set to $-\alpha$ level and the threshold level of sampler 408 is set to $+\alpha$ level. In this manner, if the preceding symbol was a '0,' sampler 407 will resolve the incoming signal as being a '1' or '0' by determining whether the signal level is above or below the partial response level $-\alpha$. Conversely, if the preceding symbol was a '1,' sampler 408 will resolve the incoming signal as being a '1' or '0' by determining whether the signal is above or below the partial response level $+\alpha$. The conditional samples output by samplers 407 and 408 are respective inputs to storage elements 412, 414 (e.g., D flip-flops or other types of storage circuits) and are provided as respective inputs to multiplexer 416. The use of the two data paths considering two possible responses is sometimes also referred to as loop unrolling.

Multiplexer 416 selects one of the conditional samples from storage elements 412, 414 based on the immediately preceding symbol, as resolved by the even-phase sample circuit 404. If the immediately preceding symbol was a logic '1,' then multiplexer 416 selects the sample value output from storage element 414; conversely, if the immediately preceding symbol was a logic '0,' then multiplexer 416 selects the sample value output from storage element 412. The selected sample value from multiplexer 416, or resolved value, is fed back as the selection signal that controls multiplexer 426 to select one of the two ensuing conditional values generated by samplers 418 and 420.

The even-phase PrDFE circuit 404 includes two samplers, 418 and 420, used to sample the input data signal $D_{in}$ at a clock phase opposite of the odd-phase receiver 402. Samplers 418 and 420 have threshold levels dependent upon the two possible partial responses to the preceding symbol. The threshold level of sampler 418 is set to $-\alpha$ level and the threshold level of sampler 420 is set to $+\alpha$ level. In this manner, if the preceding symbol was a '0,' the sampler 418 will resolve the incoming signal as being a '1' or '0' by determining whether the signal level is above or below the partial response level $-\alpha$. Conversely, if the preceding symbol was a '0,' sampler 420 will resolve the incoming signal as being a '1' or '0' by determining whether the signal is above or below the partial response level $+\alpha$.

The output circuit 406 has two storage elements to receive the resolved symbol from each PrDFE circuit (i.e., for each phase of data output). In particular, the output circuit has two storage elements 428, 430 (e.g., D flip-flops or other types of storage circuits) coupled to receive the selected sample values from odd-phase PrDFE circuit 402. Storage element 428 is clocked using a first timing choice (e.g., in response to sampling clock signal clk) and storage element 430 is clocked using a second timing choice (e.g., in response sampling clock signal clkb). Storage element 428 stores the resolved symbol from multiplexer 416 at the same phase at which multiplexer 416 receives its inputs, and storage element 430 stores the same resolved symbol at a different phase, e.g., the opposite clock phase in this example. The outputs of storage elements 428, 430 are inputs to a selection circuit or multiplexer 432. Multiplexer 432 receives a selection signal 444 that controls which of its inputs is the $D_{n-1}$ sample will then be passed as a stable output, e.g., to another storage element 434 or to some other form of output.

The output circuit 406 also has two storage elements 436, 438 (e.g., D flip-flops or other types of storage circuits) that receive the output of the even-phase PrDFE circuit 404. Storage element 436 is clocked in response to clock signal clkb and storage element 438 is clocked in response to clock signal clk. Storage element 436 stores (i.e., samples) the resolved symbol from multiplexer 426 at the same phase multiplexer 426 receives its inputs, and storage element 438 stores (i.e., samples) the resolved symbol from multiplexer 426 at a different clock phase (e.g., the opposite phase). The outputs of storage elements 436, 438 are the inputs to selection circuit or multiplexer 440. Multiplexer 440 receives a selection signal 444 that controls which of the inputs is relied upon, to represent a sampling instant where the input is guaranteed to be stable as the even-phase sample value, $D_n$. Again, this resolved symbol may be stored in storage element 442 or passed as some other form of data output.

In the embodiment presented above, the timing choices may each be one of the clocks used to time the sampling of one of the phases of a multi-phase input signal. In alternate embodiments, other clock signals may be used, or the timing choices may be generated and/or selected in some other manner.

The CAL (calibration) signal 444 is used in the embodiment of FIG. 4A to select choice of timing that will be applied. In FIG. 4A, this signal simultaneously controls selection by both multiplexers 432, 440. The CAL signal can be generated in a number of different ways, depending upon implementation or application. In one embodiment, the CAL signal can be determined on a one time basis, e.g., at system integration or assembly. In another embodiment, the CAL signal can be determined at the initialization (or power-up) of the receiver, or the IC containing the receiver, thereby incurring a one-time set up expense. Due to the thermal variation after some system operations, in yet another embodiment, calibration may be occasionally "dynamically" repeated to re-calibrate the circuits during operation. This calibration process can be performed in parallel with normal data operations of the receiver circuitry illustrated in FIG. 4A and, thus, can be made so as to not interrupt normal data transmission. During the calibration, a calibration result may be stored and replace the current CAL value with the updated timing. It is used to configure the operation of the receiver and its PrDFE circuits to the appropriate clock phase that will meet the timing constraints subject to the speed of the incoming input signal.

It would be helpful at this point to reiterate some of the performance improvements obtained by this PrDFE design.

Common problems with semiconductor devices include silicon lot variations, which can account for timing problems in specific where data signals arrive at storage elements too early in one die and late in another die, causing premature gating, latching of erroneous values, and the like. These variations may create problems at certain frequencies but not others, and may be influenced by environmental conditions, e.g., PVT variations. These device-to-device variations may also cause devices to perform marginally even for signaling rates within specification. Whatever the cause, at some point the variations can be stray outside of the bounds of reliable device operation. These instances are referred to as process corners.

In connection with the embodiments presented herein, the proximity of specific devices to process corners can to an extent be corrected for, in a manner that allows direct cross-coupled multiplexer feedback without intervening delay elements that affect the critical path (i.e., without delay elements that might affect feedback paths 417 or 429, specifically). That is to say, once the process corners are known relative to specific signaling rates, the receiver of the embodiments presented herein can be tuned so that cross-coupled PrDFE multiplexers are sampled at a time when data is known to be reliable. In the context of the embodiment of FIG. 4A, for example, the output circuit 406 uses the CAL signal to set (on an indefinite basis) timing to sample data out of the PrDFE circuits, so as to moot regions of data uncertainty. In the specific embodiment of FIG. 4A, the system does this by selecting one of two or more alternate pieces of hardware, each having a dedicated clock signal used to gate that hardware; in system 400, this is accomplished by using only a selected one of storage element pairs 428, 430 and 436, 438.

Figure 4B:
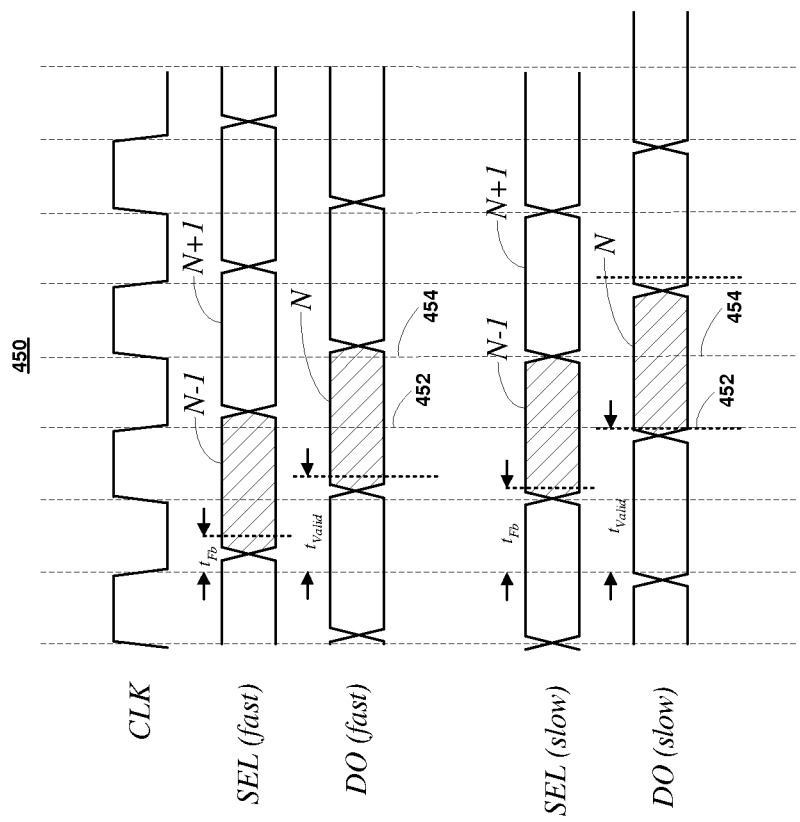
FIG. 4B provides a timing diagram useful in explaining operation of the embodiment of FIG. 4A.

Conceptually speaking, the timing problem (i.e., the uncertainty problem) is introduced with respect to FIG. 4B. FIG. 4B is used to help illustrate that the respective outputs of cross-coupled multiplexers (416 and 426 from FIG. 4A) can be guaranteed to be valid providing that the outputs are sampled at an appropriate time. A timing diagram 450 depicts a number of timing signals pertinent to a PrDFE multiplexer, such as multiplexer 416 from FIG. 4A. The depicted signals include: clk, a first clock signal (e.g., the data clock or sampling clock), select (representing arrival of a multiplexer selection signal, i.e., feedback signal 417 from the even phase PrDFE circuit 404 from FIG. 4A), and DO (representing data output from the odd phase PrDFE circuit 402 from FIG. 4A). As depicted by FIG. 4B, it is desired to choose a conditional sample for data period "N," based on feedback from the even phase PrDFE circuit from data period "N−1." Note that while the signal clkb is not illustrated in FIG. 4B, it should be understood that it is the logical inversion of signal clk, with edges that rise when the edges of signal clk fall, and vice-versa. Each of the feedforward data (not shown in FIG. 4B) and feedback signal are valid for a time roughly equivalent to a full period of signal clk, but are slightly delayed relative to the rising or falling edges (e.g., rising edges of signal clkb) owing to the propagation time from the storage elements 412, 414, 422, 424 from FIG. 4A to the multiplexer (e.g., multiplexer 416). FIG. 4B introduces the notion of two time delays, represented as $t_{Fb}$ and $t_{Valid}$, which respectively indicate timing associated with a valid multiplexer control signal, represented by the feedback path, and the output of post-multiplexer data DO selected from the feedforward path.

Since the data signal DO (FF) is valid for up to a full clock period, there will generally be at least one edge (rising or falling) of the and potentially two clock edges (rising and falling) at which the data signal produced by the multiplexer may be sampled. However, depending on signaling rates and the process corners referenced above, an unknown one of the clock edges may produce invalid (i.e., unreliable) data. FIG. 4B helps illustrate this issue. In particular, FIG. 4B shows two versions of the signal select and DO, respectively labeled "fast" and "slow;" FIG. 4B also shows two clock edges, 452 (corresponding to the rising edge of signal clk) and 454 (corresponding to the falling edge of signal clk, or equivalently, the rising edge of signal clkb). For the "fast" version, it should be observed that sampling the output of a PrDFE circuit's multiplexer will yield valid data at edge 452, but invalid data at edge 454 (in this case, the data output of the multiplexer at edge 454 would be controlled by data interval N+1). Conversely, for the "slow" versions of signals select and DO, it should be observed that sampling the output of a PrDFE circuit's multiplexer will yield valid data at edge 454, but invalid data at edge 452 (in this case, the selection process, including feedforward data from storage elements 412, 414 in FIG. 4A, arrives late enough to render uncertain the multiplexer output at edge 452).

It should be noted that the issue as to when data may be reliably sampled at the multiplexer output of each PrDFE circuit is not just a function of the total delay (e.g., the "fast" versus "slow" representations of FIG. 4B), but also the relative delay between the multiplexer selection signal and the data which is selected. Each of these signals is ideally supposed to arrive at a fixed phase different (e.g., 180, 90 degrees, and so forth, dependent on whether the receiver is a DDR, QDR or other type of PrDFE receiver), but one data phase may be slightly early or late relative to another, in large part because of the silicon processing variations just alluded to. Depending on signaling rates, the feedback from a neighboring PrDFE circuit may be relatively early or late, which further creates potential regions of data uncertainty (e.g., regions of time relative to the clock signal(s) used to time data movement through the system).

To address these issues, storage circuit pairs 428/430 and/or 436/438 provide for alternate clock selection, which effectively permit selective advance of the sampling of the "DO" from the multiplexer to be one-half clock cycle earlier, prior to a corresponding process corner's instability, i.e., selecting storage element 430 instead of storage element 428 ensures that sample output "DO" will be sampled in a manner before the next odd-phase sample can propagate to the selection signal used to control multiplexer 416. In the case of a slow process corner, it may be desired to allow more time before the sampling of data out of each PrDFE circuit by the output circuit 406, and storage elements 430,438 may be selected as providing a sampling instant which occurs at a time when sample outputs DO/DE are relatively stable. FIG. 4A thus provides a circuit which utilizes differently clocked devices which can be alternatively selected to sample at a time when the data uncertainty problem is not an issue. In turn, this selection is based in many of the embodiments presented herein on both the specific circuit in question and the signaling rate (and sampling clock signal); depending on whether the feedforward path or the feedback path presents timing issues, the output circuit is used to control sampling of the PrDFE circuits so that instability regions relative to the sampling clock are mooted. Notably, while the embodiment of FIG. 4A uses a system with two alternate hardware elements, each with dedicated timing, it should be appreciated that other embodiments are possible which can do this without using "fixed clock" elements. More than two sampler/clock choices can also be provided to offer more flexibility.

Figure 5:
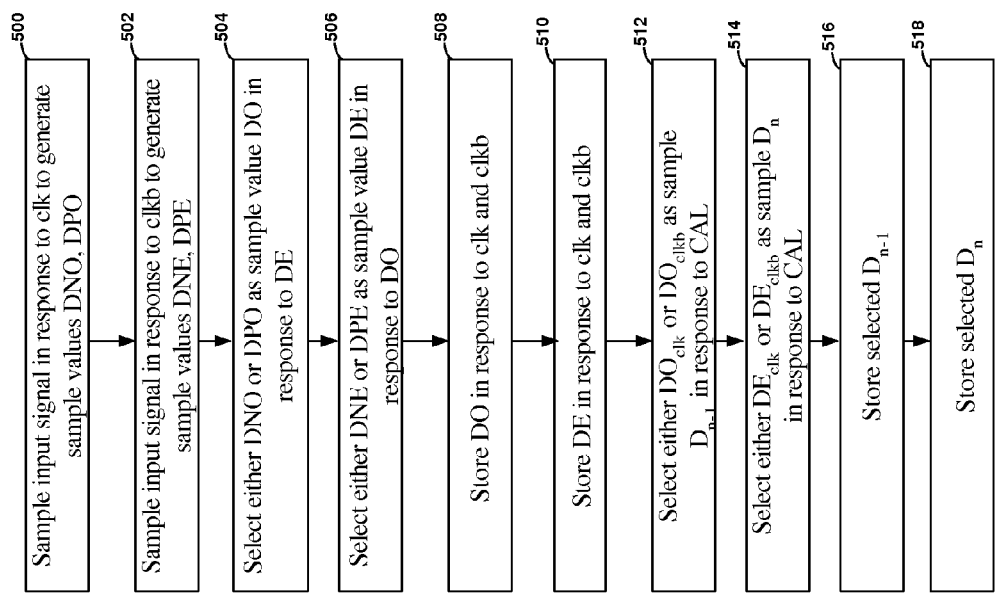
FIG. 5 is a flow chart illustrating the steps used by the DDR receiver of FIG. 4A.

FIG. 5 shows the steps that can be performed by a DDR receiver. Samplers can be used to sample an input signal $D_{in}$ in response to clock signals clk and clkb to generate odd conditional sample values DNO/DPO and DNE, DPE (steps 500 and 502). One of each of these pairs of conditional samples is then selected and output (steps 504 and 506). These samples are stored and latched out according to one of at least two clocks (e.g., clk and clkb, in a manner to avoid sampling during instability of directly cross-coupled multiplexers), per steps 508, 510, 512 and 514. Finally, signals DO and DE then also stored as final odd and even phase data output signals $D_{n-1}$ and $D_n$ (steps 516 and 518).

Figure 6:
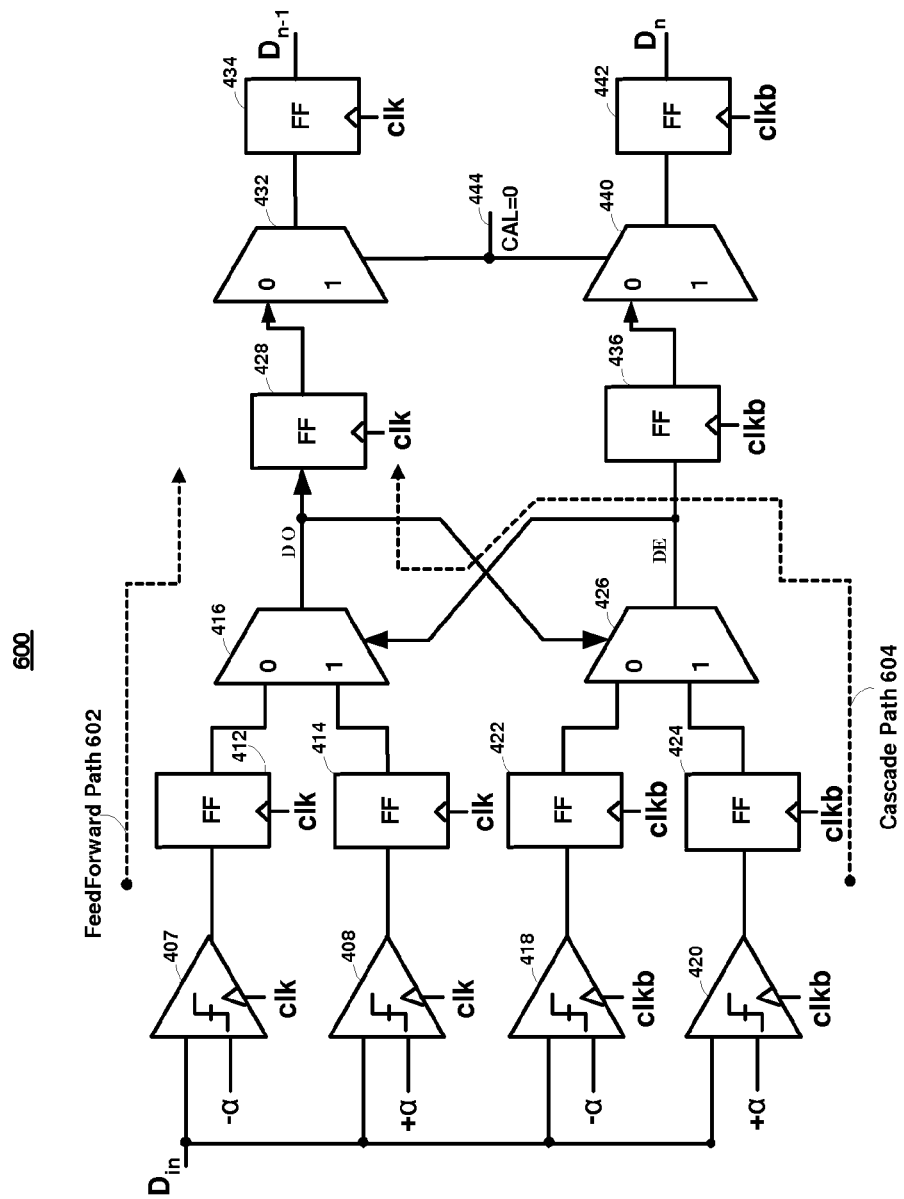
FIG. 6 illustrates a DDR receiver operating in a fast data rate region.

FIG. 6 shows how a system 600 might be configured for slow process corners relative to the data rate. For example, consider an IC device fabricated using a 40 nm CMOS process technology, with signaling rates of around 12-17 Giga bits/second (Gb/s), where the device responds too slow relative to the signaling rate. In FIG. 6, like elements from FIG. 4A are depicted using like reference numerals.

When circuitry responds slow relative to the signaling rate, the CAL signal 444 is set to '0' indicating that the output circuit 406 is to use only storage elements 428 and 436 (the other storage elements 430, 438 are left out of FIG. 6 as their outputs are left unused). Because the multiplexers for the PrDFE circuits are cross-coupled, signaling may be processed according to the timing constraint $$t_{sel} < 1 \text{ UI},$$

where $t_{sel}$ represents the time for the selected sample to control the next multiplexer 426 or 416 to select one of its inputs via feedback signal 429 or 417. However, as alluded to above, in a relatively slow circuit, clocking may be selected based on the concern that the feedforward path may be too slow, i.e., it may be problematic to clock the feedforward path subject to the constraint of $$t_{ck-Q} + t_{mux} + t_{su} < 1 \text{ UI},$$

where $t_{ck-Q}$ represents the "clock to Q" time of storage elements 412, 414, 422 and 424 and $t_{mux}$ represents the time for a selected sample to propagate through multiplexer 416 or 426, and $t_{su}$ represents the setup time of the next storage elements 428, 430, 436, and 438. [Conceptually, the situation was referenced at the bottom of FIG. 4B, where it was indicated that sampling at edge 452 might produce unreliable data, and thus it might be preferred to sample at edge 454.] The system therefore uses selected storage element 428 to sample the output of multiplexer 416 at a time that permits 2 UI for the feedforward path; because of the relatively slow circuitry, early feedback through the cross-coupled multiplexers (i.e., the "cascade" path 604) is not a problem. The system will be guaranteed to be stable as long as $t_{ck-Q} + t_{mux} + t_{su} < 2$ UI (feedforward path) and 1 UI $< t_{ck-Q} + t_{mux} + t_{sel} + t_{su}$ (cascade path). Notably, the feedforward path 602 (e.g., through circuit elements 412, 416 to storage element 428) in this case is given plenty of time, i.e., the constraint is that the feedforward path needs to complete within 2 UI, as defined by the equation $$t_{ck-Q} + t_{mux} + t_{su} < 2 \text{ UI}.$$

Figure 7:
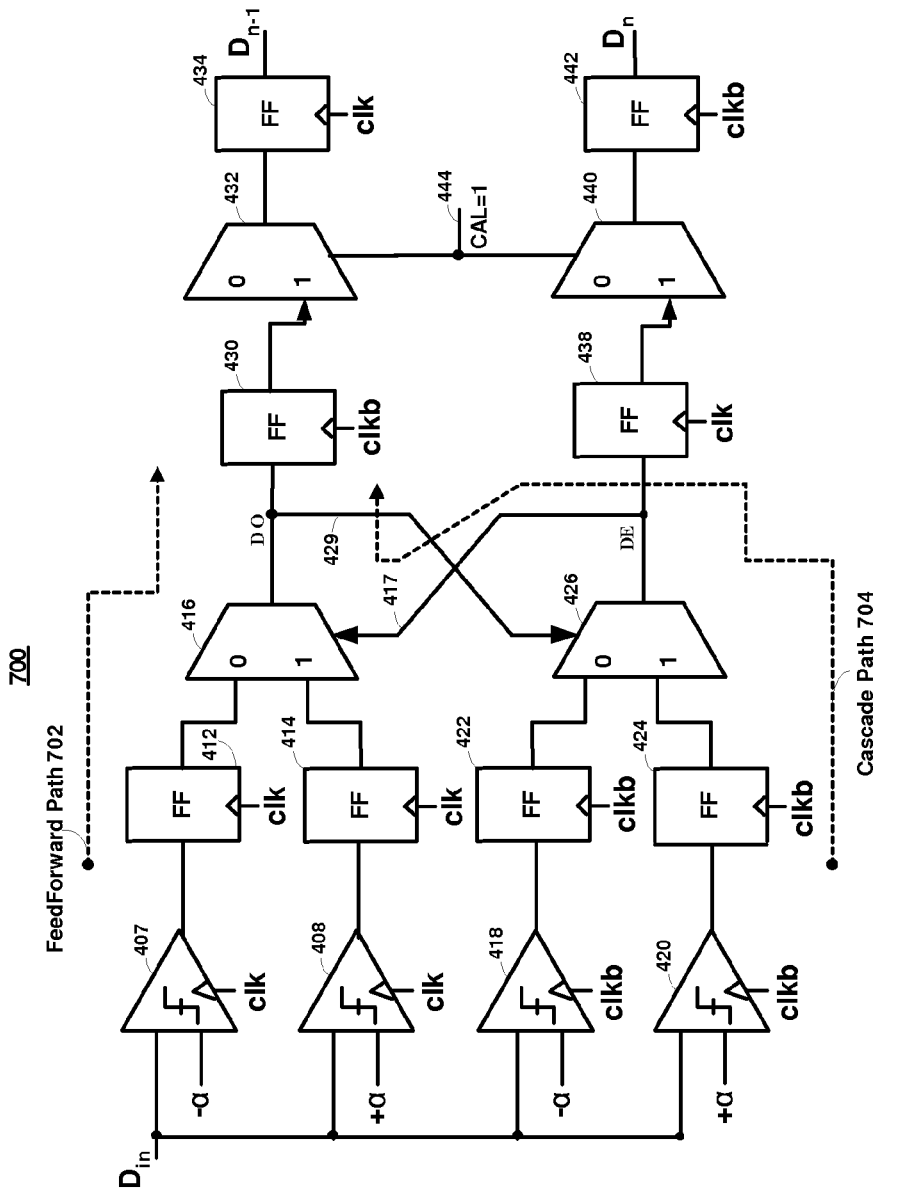
FIG. 7 illustrates a DDR receiver operating in a slow data rate region.

FIG. 7 on the other hand shows a system 700 depicting a fast process corner relative to the data rate, i.e., the particular receiver's circuitry operates faster than expected. In this case, the CAL signal 444 is set to '1' indicating that the output circuit selects between conditional sample values generated at the opposite phase, and the output circuit 406 uses only storage elements 430 and 438 (and this time, the other storage elements 428, 436 are left out as their outputs are left unused). In this case, the data outputs DO and DE are sampled according to a clock that needs to be concerned with the feedback being too fast, i.e., where $$t_{ck-Q} + t_{mux} + t_{sel} + t_{su} \sim 1 \text{ UI},$$

which is to say, if the output circuit were to sample data at the opposite phase in a DDR circuit, the feedback from the next ensuing symbol ($D_{n+1}$) might be so fast as to render sampled data unreliable. [This situation was referenced in the middle of FIG. 4A, for signal D (FF-fast) where it was mentioned it might be desired to sample at edge 452 and not sample at edge 454.] To address this, the output circuit selects output timing in a manner that provides less time for the feedback, i.e., in a manner where the output circuit samples earlier (and reads data from each phase DO and DE out) in a manner timed to be in phase with the neighboring PrDFE circuit that provides multiplexer selection control. In this instance, the timing constraint that must be satisfied is $$t_{ck-Q} + t_{mux} + t_{su} < 1 \text{ UI},$$

representing that the feedforward path (702 in FIG. 7) is only given 1 UI to complete, meaning that data must migrate between storage elements 412/414 and 430, as well as between storage elements 422/424 and 438, in less than this amount of time. In this case (i.e., a fast corner relative to the data rate), the cascade path 704 is given plenty of time to resolve, as represented by $$0 << t_{ck-Q} + t_{mux} + t_{sel} + t_{su} < 2 \text{ UI},$$

but the system avoids the fast data region based on its selection of the clock used to sample the output of multiplexers 432 and 440.

There is also an overlap region where the PrDFE circuits where the rate is just right, which is to say, neither the fast corner nor the slow corner is invoked. Mathematically, the overlap region is described as follows:

$$t_{ck-Q} + t_{mux} + t_{su} < 1 \text{ UI} < t_{ck-Q} + t_{mux} + t_{sel} + t_{su},$$

where the slow data rate region would mathematically be represented by $t_{ck-Q} + t_{mux} + t_{su} < 1$ UI, and the fast data rate region (associated with the feedback path) is $t_{ck-Q} + t_{mux} + t_{sel} + t_{su} > 1$ UI. In this case, the value of the CAL signal does not matter, i.e., the receiver should operate without reliability issues irrespective of the value CAL.

In one embodiment, the determination of the appropriate setting for the CAL signal is made based on selecting the region with the larger timing margin. Mathematically, these margins can be described as follows:

Slow data rate region margin=1 UI$-(t_{ck-Q} + t_{mux} + t_{su})$; and

Fast data rate region margin=$(t_{ck-Q} + t_{mux} + t_{sel} + t_{su}) - 1$ UI.

These quantities can be measured, and once relative magnitude is determined, the signal CAL may be responsively set.

The above timing analysis described above with respect to FIGS. 6 and 7 shows that the embodiments described herein provide a significant speedup over many conventional PrDFE designs, such as shown in FIG. 1. Of note is that the feedback timing constraint obtained by cross coupled multiplexers (i.e., $t_{sel} < 1$ UI) can permit operation between 1.5 to 2 times the speed of some conventional PrDFE designs (e.g., where the feedback constraint is $t_{ck-Q} + t_{sel} < 1$ UI). In addition, this speed improvement is achieved without increasing the timing delays of the feedforward and cascade (i.e., feedforward and feedback) paths. Attention now turns to a discussion of the embodiments of the calibration circuitry and methods.

Figure 8:
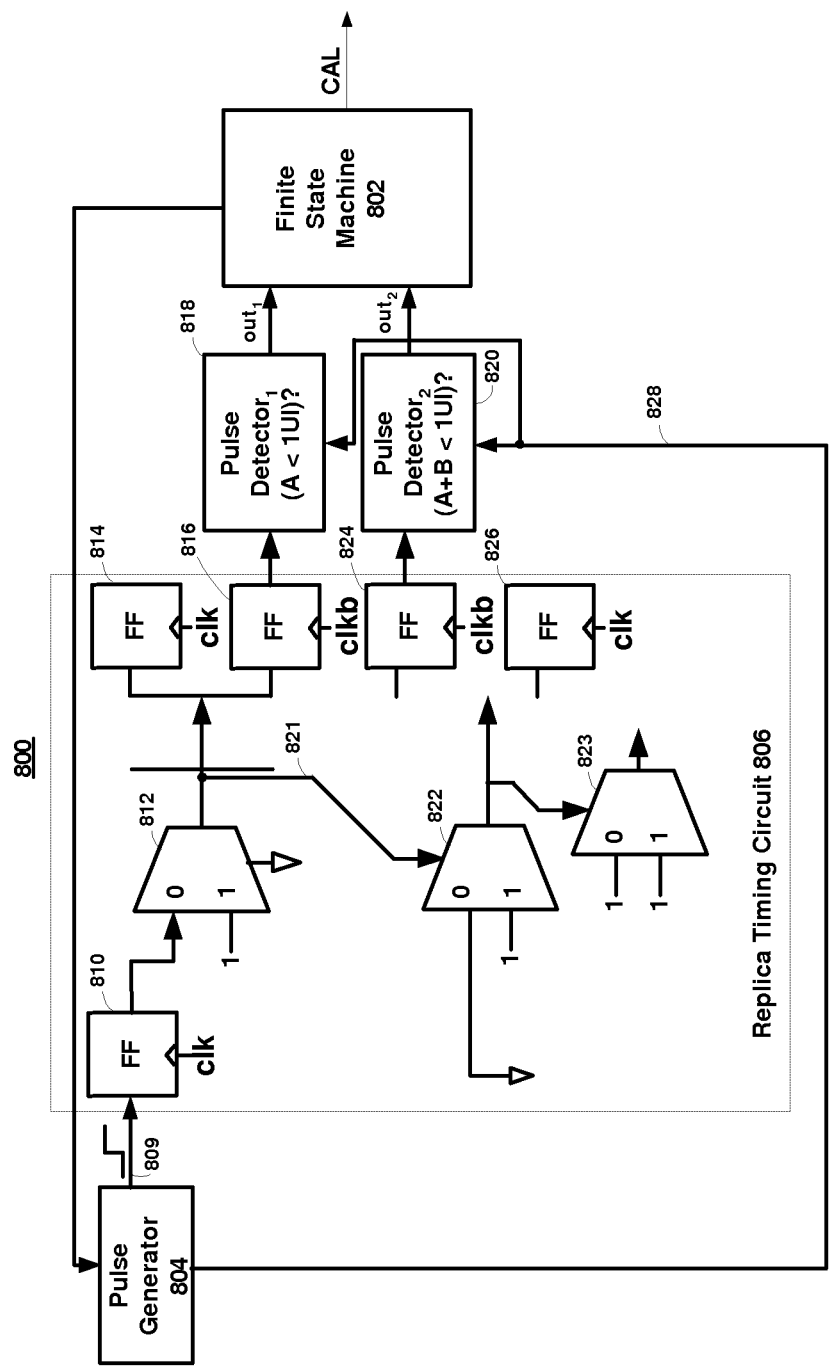
FIG. 8 illustrates calibration circuitry in accordance with one embodiment.

FIG. 8 depicts one embodiment of the calibration circuitry 800. The calibration circuitry 800 is a dedicated circuit that may be operated independently of normal receiver circuitry, but which is clocked in the same manner, and notably, at the same temperature, pressure etc. Thus, the embodiment of FIG. 8 is suitable if desired for dynamic calibration, to correct for PVT variations. To this effect, the calibration circuitry 800 may be positioned in close proximity to the PrDFE circuitry. The calibration circuitry 800 is configured to analyze the timing delays of the critical circuit elements in the feedforward and feedback paths of the PrDFE receiver. In order to simplify the timing constraints associated with the PrDFE noted above, the timing constraints are rewritten as follows. Let $A=t_{ck-Q}+t_{mux}+t_{su}$ and $B=t_{sel}$. The variable A represents the feedforward path which is also contained in the cascade path. The variable B represents the additional timing factor that provided by the cascade feedback path but not the feedforward path (i.e., it represents the "pure" feedback path). The analysis can then be reduced to analyzing the circuit paths relative to 1 UI. The calibration circuitry is configured to determine whether A is greater than 1 UI and whether A+B is also greater than 1 UI. Thus, the analysis can be categorized into the following four cases:

Fast data rate region or slow process corner: $A > 1$ UI and $A+B > 1$ UI, then CAL=0;     (1)

Invalid case: $A > 1$ UI and $A+B < 1$ UI;     (2)

Slow data rate region or fast process corner: $A < 1$ UI and $A+B < 1$ UI, then CAL=1; and     (3)

Overlap region: $A < 1$ UI and $A+B > 1$ UI, then CAL=0 or 1.     (4)

The calibration circuitry is configured to detect these cases and set the calibration signal accordingly.

In one embodiment, the calibration circuitry 800 has a finite state machine 802, a pulse generator 804, a replica timing circuit 806, and pulse detectors 818, 820. The finite state machine 802 controls the operation of the calibration circuitry 800 and sets the value of the CAL signal. The pulse generator 804 is used to generate timing signals that flow through the replica timing circuits. The replica timing circuit 806 contains replica circuit elements in exemplary feedforward and feedback paths of the DDR (or other) PrDFE receiver. Pulse detector 818 is coupled to the output of a replica feedforward path and pulse detector 820 is coupled to the output of a replica cascade feedback path.

Replica timing circuit 806 contains the circuit elements that significantly affect the timing of the feedforward path. There is storage element 810 responsive to sampling clock signal clk. The output of the storage element 810 is coupled to a first select circuit or multiplexer 812. The first select circuit 812 is coupled to storage element 814 (clocked at clk) and storage element 816 (clocked at clkb). The output of storage element 816 is coupled to pulse detector 818. Pulse detector 818 is configured to determine whether $A < 1$ UI and transmits the output of the feedforward path, $out_1$, to finite state machine 802 at the clock cycle indicated by a selection signal 828.

Replica timing circuit 806 also contains the critical path circuit elements affecting the timing of the cascade path. There is a second multiplexer 822 configured to receive a selection signal 821 the output of multiplexer 812, and an output from this multiplexer is coupled to a further (dummy) multiplexer 823 to replicate loading effects. The output of multiplexer 812 is coupled to storage element 824 (clocked at clkb), and storage element 826 (clocked at clk). Storage element 824 is coupled to pulse detector 820. Pulse detector 820 is configured to determine whether $A+B < 1$ UI and to transmit the output of the cascade feedback path, $out_2$ to finite state machine 802 according to signal 828.

At the time when calibration is performed (i.e., during device or board assembly and/or testing, during the initialization or power-up of the IC containing the PrDFE receiver or during the initialization of the receiver, or during periodic "dynamic" calibration (e.g., performed to compensate for PVT variations), the finite state machine 802 is first initialized; the finite state machine, in turn, causes the pulse generator 804 to generate a test signal 809 synchronized to the sampling clock domain used by the receiver(s) (i.e., one or more receivers on the same integrated circuit). Clock circuitry (not shown) generates the sampling clock signals, clk and clkb. After the test signal 809 transitions to '1,' the pulse generator generates the signal 828 at a predetermined clock cycle. The signal 828 is transmitted to each of the pulse detectors 818, 820 to measure output signals, $out_1$ and $out_2$, and to transmit their states to the finite state machine 802. The signal 828 is generated so that the phase detectors read the output signals, $out_1$ and $out_2$, at the clock cycle after completion of the longest data path. The finite state machine 802 receives signals $out_1$ and $out_2$ and based on these values, determines the correct setting of the calibration signal, CAL.

The table shown in FIG. 9 depicts the settings for the CAL signal made by the finite state machine based on the various combinations of values for $out_1$ and $out_2$.

In the overlap region, where $A < 1$ UI and $A+B > 1$ UI, the finite state machine 802 can repeat the timing analysis repeatedly for a predetermined number of times, n. At the completion of the $n^{th}$ pass through the replica timing circuit 806, the finite state machine 802 can set the CAL signal to the value that was detected most frequently. After the CAL signal is set, the finite state machine 802 can terminate the calibration process.

As represented by this description, in one embodiment, a calibration process (e.g., with separate dummy circuits) can be used for each receiver of a circuit (e.g., an "IC" having multiple receivers). This configuration may be useful for the system of FIG. 2B, especially where each channel or lane uses slightly different timing such as for example dedicated clock phase circuitry. Alternatively, in many embodiments, it may be sufficient to have a single calibration circuit that is shared across multiple receivers (e.g., for an entire IC or part of an IC).

Figure 10:
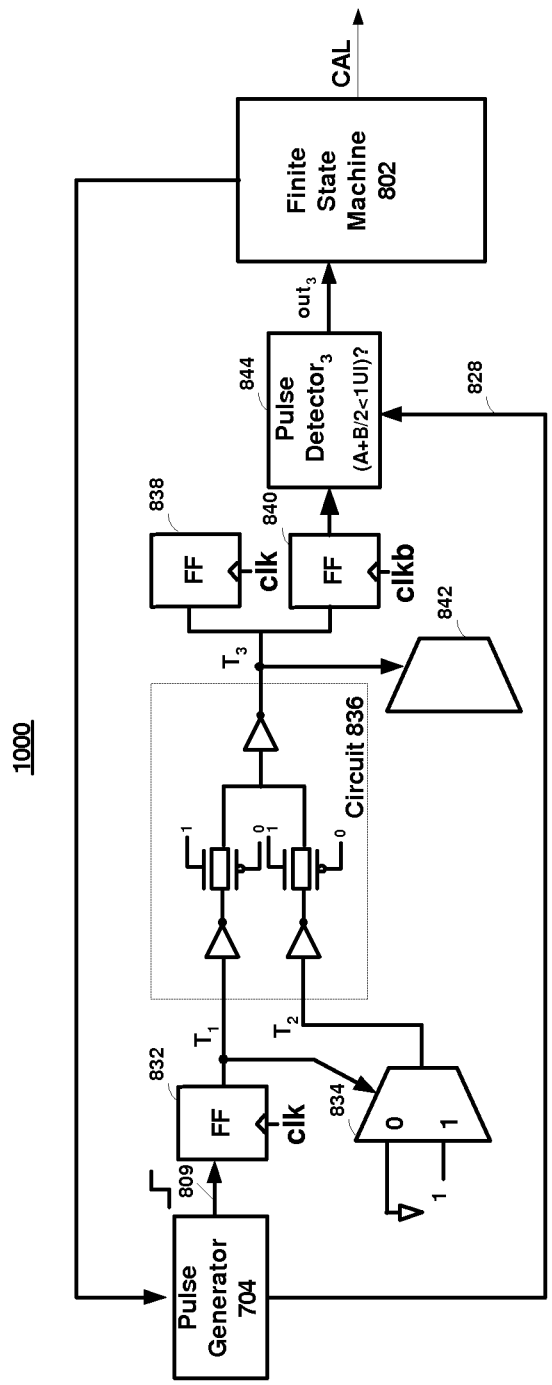
FIG. 10 illustrates calibration circuitry in accordance with another embodiment.

FIG. 10 illustrates another embodiment of the calibration circuitry 1000 that identifies the calibration setting having the better timing margin or lower bit error rate. This would be the represented by the region that is furthest from 1 UI, i.e., where $A < 1$ UI and $A+B > 1$ UI This selection can be expressed in terms of determining whether $A+B-1$ UI$<1$ UI$-A$, rewritten as $A+B/2<1$ UI Accordingly, the calibration circuitry 1000 is configured to detect the timings of the feedforward and cascade paths relative to the inequality, $A+B/2<1$ UI. When $A+B/2>1$ UI, then the receiver is determined to be operating slow relative to data and CAL is set to 0. Otherwise, when $A+B/2<1$ UI, the receiver is determined to be operating fast relative to data, and CAL is set to 1.

Several time points, $T_1$-$T_4$, are illustrated in FIG. 10. At time $T_1$, the timing delay is $t_{ck-Q}$; at time $T_2$, the delay is $t_{ck-Q}+t_{sel}$; at time $T_3$, the delay is an average of delays from T1 to T3 and from T2 to T3, i.e., average of $t_{ck-Q}+t_{mux}$ and $t_{ck-Q}+t_{mux}+t_{sel}$, i.e., $t_{ck-Q}+t_{mux}+t_{sel}/2$. Taking into account of the setup time $t_{su}$ of the storage element 840, the system effectively produces a pulse that provides a result dependent on relative timing between A+B/2 and 1 UI, associated with delays between the clocking of data out from storage element 832 at clk and the triggering of storage element 840 at o clkb.

The calibration circuitry 1000 includes a storage element 832 which receives test signal 809 from pulse generator 804 and responds to clock signal clk. The output of storage element 832 is fed into the selection control for multiplexer 834. The outputs of storage element 832 and multiplexer 834 are inputs to circuit 836. Circuit 836 is effectively a modified multiplexer which produces an output which is dependent on both of its inputs, representing the average timing of both inputs plus circuit propagation delays, and the output is then both fed as the selection signal to a dummy multiplexer 842 and transmitted to storage elements 838 and 840. Storage element 838 is responsive to clock signal, clk, and storage element 840 is responsive to clock signal, clkb. The output of storage element 840 is transmitted to pulse detector 844. Pulse detector 844 detects the value of the output signal, $out_3$, in response to the selection signal 828. The output signal, $out_3$, is transmitted to finite state machine 802 which, in turn, determines the appropriate setting for the CAL signal as shown in FIG. 11.

Although the embodiments herein have been shown with respect to a DDR signaling system, the technology described herein can be easily adapted to any multi-phase signaling system, such as without limitation, a quadruple or quad data rate (QDR) signaling system, an octal data rate (ODR) signaling system, and the like. By way of example, attention now turns to a discussion of a QDR signaling system employing the PrDFE technology described herein.

Figure 12:
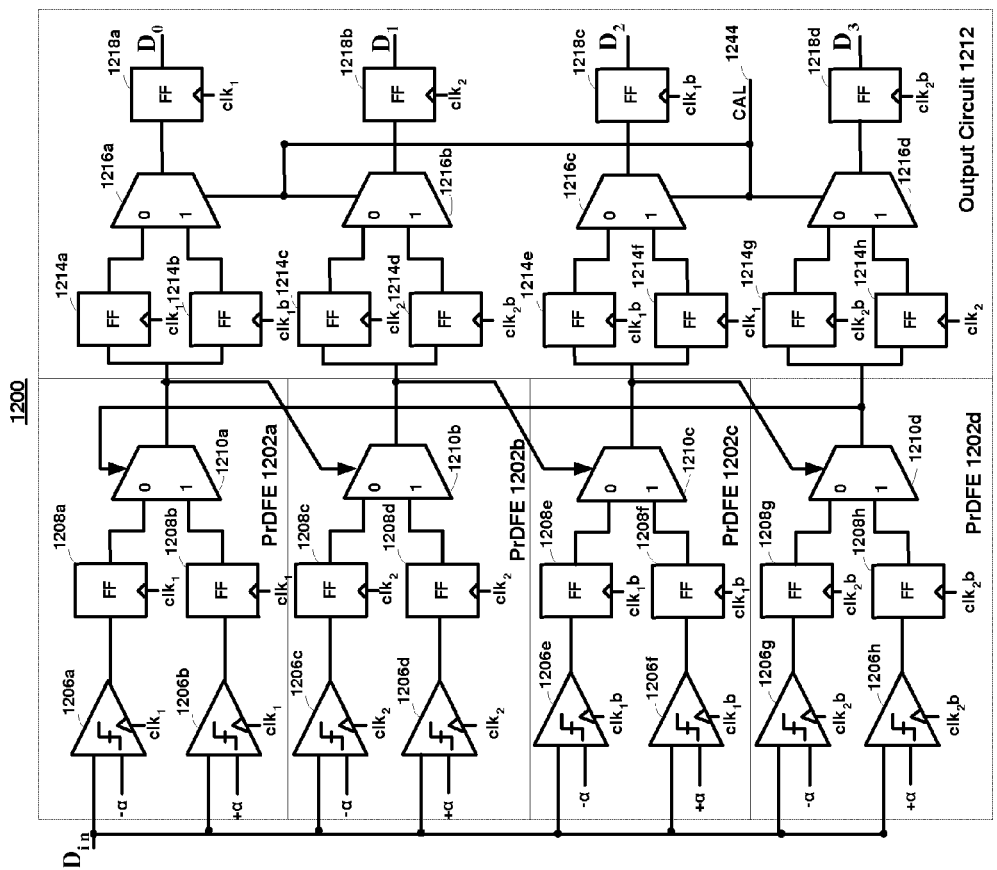
FIG. 12 illustrates the use of PrDFE in accordance with a quadruple data rate (QDR) embodiment.

FIG. 12 shows an embodiment of a PrDFE receiver 1200 used in a QDR signaling system. The receiver 1200 includes four quarter-cycle PrDFE circuits 1202a-d coupled such that resolved symbol from a first quarter-phase PrDFE circuit 1202a is used to select a conditional sample within a second quarter-phase PrDFE circuit 1202b (this value symbol is the same as the output $D_0$ provided by the output circuit, at the right side of FIG. 12, though without the additional delay applied by the output circuit). Similarly, a resolved symbol output from the second quarter-phase PrDFE circuit 1202b is used to select a conditional sample in a third quarter-phase PrDFE circuit 1202c, and a resolved symbol output from this circuit is used to select a conditional sample in a fourth quarter-phase PrDFE circuit 1202d. Finally, a resolved symbol from the fourth quarter-phase PrDFE circuit 1202d is used to select a conditional sample in the first quarter-phase PrDFE 1202a.

Figure 13:
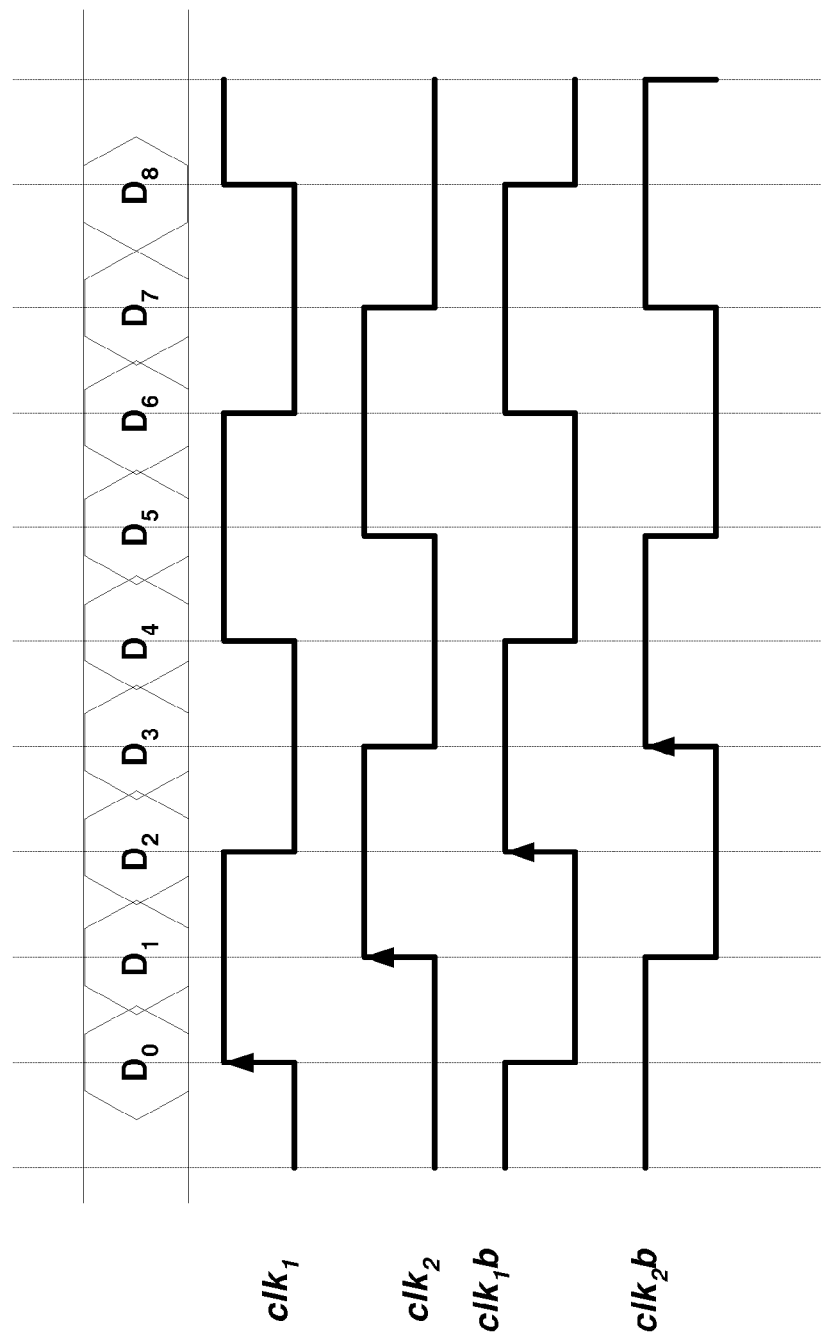
FIG. 13 illustrates waveforms used in the signaling system shown in FIG. 12.

FIG. 13 shows a quadruple signaling system where four bits or symbols (e.g., $D_0D_3$) of the incoming data signal are captured during each clock cycle, or sampling period. A clock generation circuit (not shown) generates four sampling clock signals that are phase-distributed such that the signals are equally distributed at 90° phase intervals. There are four sampling clocks, $clk_1$, $clk_2$, $clk_{1b}$, and $clk_{2b}$, each derived from am common source (having the same frequency) and having relative phases of 0°, 90°, 180°, and 270°, respectively. The rising edge of clock signal $clk_1$ starts 90° before the rising edge of $clk_2$, the rising edge of clock signal $clk_2$ starts 90° before the rising edge of signal $clk_{1b}$, and the rising edge of $clk_{1b}$ starts 90° before the next rising edge of $clk_{2b}$, and the rising edge of clock signal $clk_{2b}$ starts 90° before the next rising edge of $clk_1$.

Referring back to FIG. 12, each PrDFE circuit 1202a-d includes two samplers, 1206a-h used to sample the input data signal $D_{in}$. Samplers 1206a-h have threshold levels that correspond to two possible partial responses to the immediately preceding symbol (that is, the symbol from the immediately prior sampling phase). The threshold level of samplers 1206a,c,e,g is set to $-\alpha$ level and the threshold level of samplers 1206b,d,f,h is set to $+\alpha$ level. In this manner, if the preceding symbol was a '0', samplers 1206a,c,e,g will provide correct resolution of the incoming signal via comparison to the appropriate partial response level, $-\alpha$. Conversely, if the preceding symbol was a '1', samplers 1206b,d,f,h will provide the correct resolution of the incoming signal via comparing it to the partial response level $+\alpha$.

The conditional samples output by samplers 1206a-h are respective inputs to storage elements 1208a-h (e.g., D flip-flops or other types of storage circuits) and are respective inputs to a multiplexer 1210a-d. Each multiplexer 1210a-d selects one of the conditional samples from respective ones of storage elements 1208a-h based on the immediately preceding symbol. If the immediately preceding symbol was a logic '1', then each multiplexer 1210a-d selects the conditional samples output from respective storage element 1208b,d,f,h; conversely, if the immediately preceding symbol was a logic '0', then each multiplexer 1210a-d selects the conditional samples output from respective storage element 1208a,c,e,g.

The selected sample value (i.e., sample selected to represent the resolved symbol) from multiplexer 1210a is fed as the selection signal for multiplexer 1210b to select one of the two conditional samples generated by samplers 1206c and 1206d; the sample selected from multiplexer 1210b is fed as the selection signal for multiplexer 1210c to select one of the two conditional samples generated by samplers 1206e and 1206f; the sample selected from multiplexer 1210c is fed as the selection signal for multiplexer 1210d, to select one of the two conditional samples generated by samplers 1206g and 1206h; and sample selected from multiplexer 1210d is fed as the selection signal for multiplexer 1210a, to select one of its two conditional samples (i.e., from samplers 1206a and 1206b).

The output circuit 1212 has two storage elements (e.g., D flip-flops or other types of storage circuits) for each PrDFE circuit, coupled to receive the sample selected by the corresponding PrDFE circuit to represent the resolved symbol. The output circuit 1212 samples that symbol according to a selected one of at least two different clock phases. In particular, storage elements 1214a-b are coupled to receive the resolved symbol value of multiplexer 1210a at each of two differently phased versions of sampling clock $clk_1$, where storage element 1214a is clocked in response to sampling clock signal $clk_1$ and storage element 1214b is clocked in response to sampling clock signal $clk_1$b. Multiplexer 1216a receives the outputs of these storage elements 1214a-b and responsive to the signal CAL, selects one of the values as the $D_0$ value. As mentioned, this output value can then be stored in storage element 1218a or provided as some other form of output.

Storage elements 1214c-d are coupled to receive the resolved symbol from multiplexer 1210b at each of two phases of a sampling clock $clk_2$, where storage element 1214c is clocked in response to sampling clock signal $clk_2$ and storage element 1214d is clocked in response to sampling clock signal $clk_2$b. Multiplexer 1216b receives the outputs of storage elements 1214c-d and selects one of these according to the signal CAL as the $D_1$ value, which then can be stored in storage element 1218b.

Storage elements 1214e-f are coupled to receive the resolved symbol output from multiplexer 1210c at each of two phases of a corresponding sampling clock $clk_{1b}$, where storage element 1214e is clocked in response to sampling clock signal $clk_1$b and storage element 1214f is clocked in response to sampling clock signal $clk_1$. Multiplexer 1216c receives the outputs of these storage elements and selects one of them as an output value $D_2$, which then can be stored in storage element 1218c.

Similarly, storage elements 1214g-h are coupled to receive the resolved symbol from multiplexer 1210d at each of two phases of sampling clock $clk_{2b}$, where storage element 1214g is clocked in response to sampling clock signal $clk_2b$ and storage element 1214h is clocked in response to sampling clock signal $clk_2$. Multiplexer 1216d receives the outputs of storage elements 1214g-h and selects one of these according to the signal CAL for output as the $D_3$ value, which then can be stored in storage element 1218d.

As mentioned, the CAL signal 1244 is set by calibration circuitry.

The QDR PrDFE receiver operates within the following timing constraints:

Feedback path: $t_{sel}$<1 UI;

Feedforward path: $t_{ck-Q}+t_{mux}+t_{su}$<4 UI; and

Figure 14:
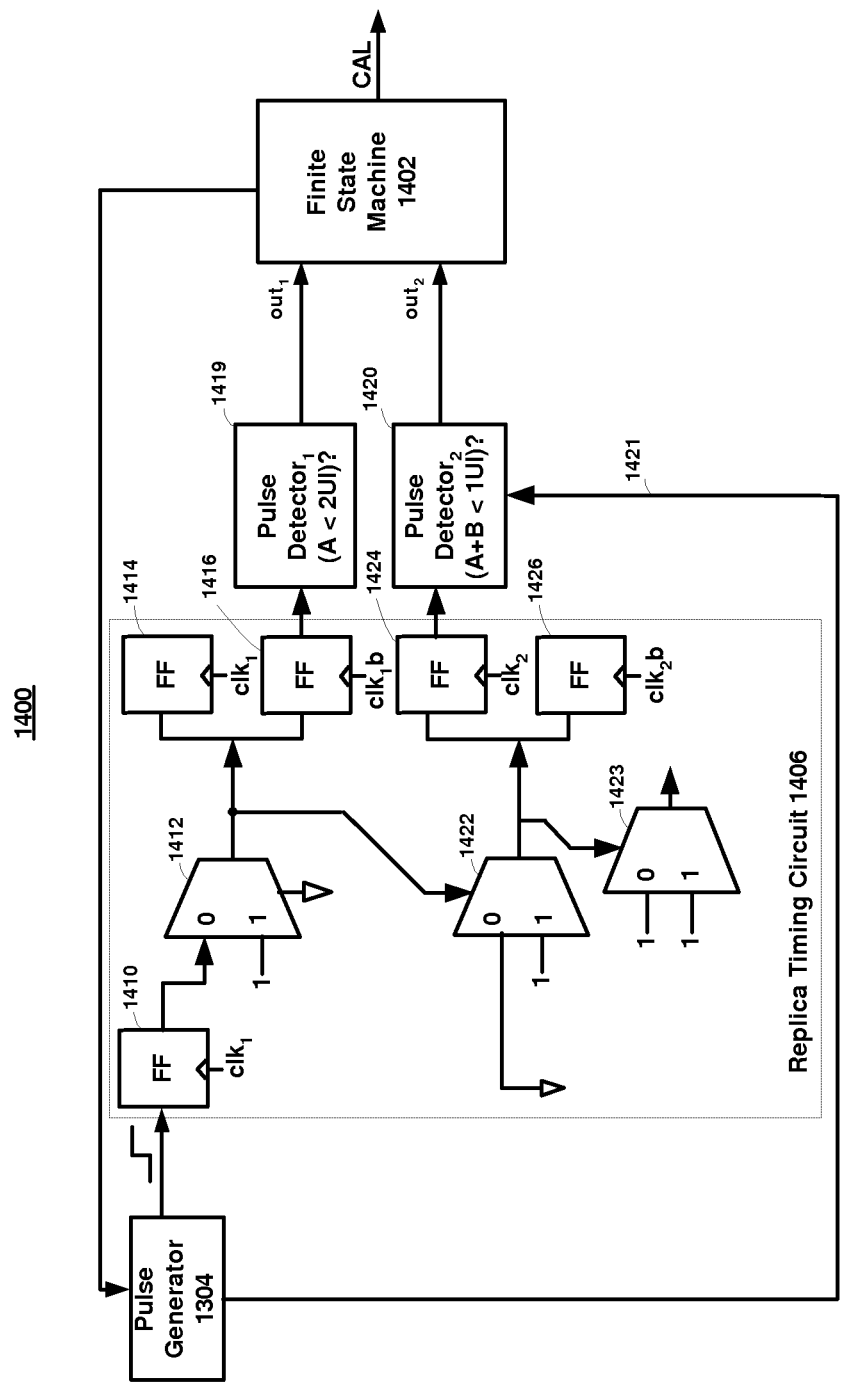
FIG. 14 illustrates calibration circuitry for use in a quadruple data rate embodiment.

An embodiment of the calibration circuitry for the quad rate PrDFE receiver 1200 is shown in FIG. 14. The calibration circuitry is configured to analyze the timing delays of the critical circuit paths, feedforward and feedback. In the case of a quad rate signaling system, the analysis can be categorized into the following four cases:

Fast data rate or slow process corner: $A$>2 UI and
    $A+B$>1 UI, then CAL=0; (1)

Invalid case: $A$>2 UI and $A+B$<1 UI; (2)

Slow data rate or fast process corner: $A$<2 UI and
    $A+B$<1 UI, then CAL=1; (3)

Overlap region: $A$<2 UI, $A+B$>1 UI then CAL=0 or 1. (4)

In these equations, $A=t_{ck-Q}+t_{mux}+t_{su}$ and $B=t_{sel}$.

FIG. 14 shows an embodiment of calibration circuitry that may be used for the embodiment of FIG. 12, e.g., for dynamic calibration. As seen in FIG. 14, the calibration circuitry 1400 has a finite state machine 1402, a pulse generator 1404, a replica timing circuit 1406 and pulse detectors 1419, 1420.

An exemplary replica feedforward timing path is composed of storage element 1410, clocked according to $clk_1$, whose output is input to multiplexer 1412. The output of multiplexer 1412, is input to storage element 1414, which is responsive to clock signal $clk_1$, and to storage element 1416, which is responsive to clock signal $clk_{1b}$. The output of this timing path is transmitted to pulse detector$_1$ 1419 which is configured to determine whether the timing delay of the feedforward path is greater or less than 2 UI based on the value of out$_1$ at the clock cycle selected for this input. The output of pulse detectors 1419, out$_1$, is then transmitted to the finite state machine 1402.

An exemplary replica cascade timing path is composed of storage element 1410, which is clocked according to signal $clk_1$. The output of this storage element is then input to multiplexer 1412, which in turn generates the selection signal used to control multiplexer 1422. The output of multiplexer 1422 is transmitted both to storage element 1424 (clocked according to signal $clk_2$), and to storage element 1426 (clocked according to signal $clk_{2b}$), again with a dummy multiplexer 1423 present to replicate circuit loading effects. The output of this timing path is transmitted to pulse detector$_2$ 1420 which is configured to determine whether the timing delay of the cascade feedback path is greater or less than 1 UI. The output of pulse detector$_2$ 1420, out$_2$, is then transmitted to the finite state machine 1402.

The finite state machine 1402 determines the appropriate setting for the CAL signal based on the outputs from pulse detectors 1419 and 1420. The table in FIG. 15 shows the settings for the CAL signal made by the finite state machine 1402 based on the various combinations of out$_1$ and out$_2$. In the region where $A$<2 UI and $A+B$>1 UI, the finite state machine 1402 can repeat the timing analysis repeatedly for a predetermined number of times, n. At the completion of the $n^{th}$ pass through the replica timing circuit 1406, the finite state machine 1402 can set the CAL signal based on the analysis result that was detected most frequently. After the CAL signal is set, the finite state machine 1402 can terminate the calibration process.

The embodiments described herein provide versatile PrDFE receivers able to accommodate a range of data rate signaling paths. This capability is achieved with minimal overhead and expense. The additional circuitry does not alter the timings of the critical paths since it is on the replica data paths and not in the critical paths. In addition, the additional circuitry does not alter the clock distribution. There is a minimal increase in power consumption which is exhibited only at IC initialization (or at other calibration) and, thereafter, the calibration circuitry can be powered down. More importantly, response speeds provided by the PrDFE designs presented herein are permit usage of relatively smaller (shorter) unit intervals, i.e., can be used with relatively faster signaling rates without imposing a stability bottleneck.

Importantly, by providing for output timing adjustment, the designs presented herein permit direct cross-coupling of multiplexers in a PrDFE receiver, while using timing adjustment to avoid data uncertainty problems. The embodiments presented above address this by providing output latches (i.e., samplers or storage elements) that are differently clocked and may be alternatively selected. However, there are many other designs for varying output timing in a manner consistent with the principles presented above. For example, more than two timing choices may be offered, or timing choices may be made variable based on variable delays, time borrowing, or other techniques. In addition, there may be many other ways of performing the calibration referenced above, or otherwise estimating or predicting the operation of any given design relative to desired signaling rates. Various alternative designs based on the principles expressed above will no doubt be apparent to those having skill in the art.

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The various embodiments described herein can be used in various communication systems using time-dispersive channels or signaling paths causing ISI interference, such as, without limitation, memory devices, memory systems, optical communication devices, telecommunication devices (e.g., modems), and the like. As mentioned, in one contemplated implementation, these embodiments may be used in a memory system having a memory controller and one or more DRAM memories, each of these configured if desired as discrete integrated circuits.

An output of a process for designing an integrated circuit, or a portion of an integrated circuit, having one or more circuits described herein may be a computer readable medium, such as without limitation, a magnetic tape, optical disk, magnetic disk, or the like. The computer readable medium may be encoded with data structures or other information describing circuitry that may be physically instantiated as an integrated circuit or a portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those skilled in the art of integrated circuit design can develop such data structures from schematic diagrams of the type detailed above and the corresponding descriptions and encode the data structures on computer readable medium. Those skilled in the art of integrated circuit fabrication can use such encoded data to fabricate integrated circuits comprising one or more of the circuits described herein.

We claim:

1. A multi-phase partial response receiver, comprising:
    at least two partial response circuits, each partial response circuit to sample an input signal according to a respective phase of the input signal and to generate a value based on a previously resolved symbol from the input signal; and
    an output circuit to receive the values from the at least two partial response circuits, to select a timing from at least two timing choices, and to output each value according to the selected timing.

2. The multi-phase partial response receiver of claim 1, wherein the output circuit further comprises for each phase of the multi-phase partial response receiver a selection circuit and at least two associated storage elements, each selection circuit to output each value according to a selected one of the at least two timing choices.

3. The multi-phase partial response receiver of claim 2, wherein:
    each storage element is to delay the value for an associated phase of the multi-phase partial response receiver, each storage element delaying the value for the associated phase of the multi-phase partial response receiver according to a respective one of at least two clock signals; and
    the selection circuit for the associated phase of the multi-phase partial response receiver further comprises a multiplexer to select between outputs of the associated storage element according to a calibration signal.

4. The multi-phase partial response receiver of claim 2, wherein each storage element is a flip flop.

5. The multi-phase partial response receiver of claim 1, wherein:
    each partial response circuit includes a multiplexer that selects one of plural conditional samples; and
    an output of each multiplexer drives conditional sample selection by the multiplexer of one of the other partial response circuits, a path between the output of the multiplexer which it drives not have any intervening storage element.

6. The multi-phase partial response receiver of claim 5, wherein the output circuit further comprises for each phase of the multi-phase partial response receiver a selection circuit and at least two associated storage elements, and wherein each timing choice is represented by a clock signal, each selection circuit to sample an output of a respective one of the multiplexers according to a selected one of the at least two clock signals, the storage elements for each selection circuit each receiving a respective one of the at least two clock signals and sampling the output of the respective multiplexer according to the respective one of the at least two clock signals, each selection circuit selecting between the outputs of the associated storage elements.

7. The multi-phase partial response receiver of claim 6, wherein each selection circuit selects between the outputs of the associated storage elements in dependence upon a calibration signal.

8. The multi-phase partial response receiver of claim 1, further comprising a calibration circuit to control the output circuit to select the one of the at least two timing choices, the calibration circuit having:
    a replica circuit to replicate a timing path in the multi-phase partial response receiver; and
    control circuitry to test the replica circuit and to responsively control the output circuit to select the one of the at least two timing choices.

9. The multi-phase partial response receiver of claim 8, wherein the control circuitry further comprises:
    a signal generator to generate a test signal for the replica timing circuit; and
    a signal detector to detect outputs of the replica timing circuit based on the test signal.

10. The multi-phase partial response receiver of claim 1, embodied as a double data rate partial response receiver.

11. The multi-phase partial response receiver of claim 1, embodied as a quad data rate partial response receiver.

12. The multi-phase partial response receiver of claim 1, embodied in a memory device.

13. The multi-phase partial response receiver of claim 1, embodied in a memory controller.

14. The multi-phase partial response receiver of claim 1, embodied in an integrated circuit.

15. The multi-phase partial response receiver of claim 1, wherein the at least two timing choices are sampling clocks, the sampling clocks having a common frequency and a phase difference that is a multiple of ninety degrees.

16. The multi-phase partial response receiver of claim 1, further comprising a calibration circuit to control the output circuit to select the one of the at least two timing choices, wherein the calibration circuitry performs calibration in dependence upon each power-on of the multi-phase partial response receiver.

17. The multi-phase partial response receiver of claim 1, further comprising a calibration circuit to control the output circuit to select the one of the at least two timing choices, wherein the calibration circuitry performs calibration on a one-time basis.

18. The multi-phase partial response receiver of claim 1, further comprising a calibration circuit to control the output circuit to select the one of the at least two timing choices, wherein the calibration circuitry performs calibration on a dynamic basis during normal data operations of the multi-phase partial response receiver.

19. The multi-phase partial response receiver of claim 18, wherein the calibration circuit includes a test path that is independent from the at least two partial response circuits, the test path for use during normal data operations of the multi-phase partial response receiver.

20. A method employed in a digital receiver that receives an input signal, comprising:
    using at least two partial response circuits to sample respective data phases of the input signal, each partial response circuit generating plural conditional samples and outputting a value selected from the plural conditional samples dependent on a previously resolved datum from another one the at least two partial response circuits; and outputting each symbol according to a selected one of at least two timing choices.

21. The method of claim 20, wherein:

the method further comprises calibrating a first data path of the digital receiver; and outputting includes sampling each value based on the calibrating of the first data path.

22. The method of claim 20, wherein:

the method further comprises calibrating a second data path in the digital receiver; and outputting includes sampling each value based on the calibrating of the second data path.

23. The method of claim 20, wherein each partial response circuit includes a multiplexer to select between the respective plural conditional samples, the method further comprising:

driving selection by each one of the multiplexers using the output from the multiplexer for another one the at least two partial response circuits without any intervening storage element.

24. The method of claim 23, wherein the digital receiver further includes a test circuit that is independent from the at least two partial response circuits, the method further comprising periodically performing dynamic selection of the one of the at least two timing choices according to an output of the test circuit, the test circuit being used in parallel with normal data operations of digital receiver.

25. The method of claim 24, further comprising using a sampling clock for each timing choice.

26. A system, comprising:

a plurality of communications channels, each communication channel conveying a sequence of data; and a receive device having a plurality of receivers, one receiver for each communications channel, each receiver including at least two partial response circuits, each partial response circuit to sample an input signal according to a respective phase of the input signal and to generate a value based on at least one previously resolved datum from the input signal, and an output circuit to receive the values from the at least two partial response circuits, and to output each value according to a selected one of at least two clock signals.

27. The system of claim 26, further comprising a transmit device coupled to the plurality of communications channels, the transmit device transmitting the sequences.

28. The system of claim 27, wherein the transmit device includes one of a memory controller and a memory device and the receive device includes the other of the memory controller and the memory device.

29. The system of claim 28, wherein the memory device is a dynamic random access memory.

30. The system of claim 27, wherein the plurality of receivers are coupled to at least one calibration circuit, the at least one calibration circuit controlling for each receiver the selection of selection between the at least two clocks.

31. A partial response receiver, comprising:

a first sampler to sample an input signal according to a first clock phase of a sampling clock to generate a first sample;

a second sampler to sample the input signal according to the first clock phase to generate a second sample;

a select circuit that selects either the first or second sample to be output as a value according to a previously generated datum; and an output circuit that receives the value output from the select circuit, that samples the value according to each of the first and second clock phase to generate respective sampled values, and that chooses one of the one of the sampled values to output.

32. The partial response receiver of claim 31, further comprising:

a calibration circuit to detect timings on at least one path and to direct the output circuit to choose the one of the sampled values based on the timings.

33. A multi-phase partial response receiver, comprising:

means for sampling an input signal according to a respective phase of the input signal and for generating a value for each phase in dependence upon a previously resolved datum; and means for selecting at least one of two clock signals and for sampling each value according to a selected one of the at least two clock signals.

* * * * *